(12) United States Patent
Matsumoto et al.

(10) Patent No.: US 8,779,808 B2
(45) Date of Patent: Jul. 15, 2014

(54) OUTPUT CIRCUIT FOR A BUS

(75) Inventors: Isao Matsumoto, Kanagawa (JP); Hidekazu Kikuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1467 days.

(21) Appl. No.: 11/984,714

(22) Filed: Nov. 21, 2007

(65) Prior Publication Data

US 2008/0136506 A1 Jun. 12, 2008

(30) Foreign Application Priority Data

Dec. 12, 2006 (JP) ................... 2006-334325

(51) Int. Cl.
*H03B 1/00* (2006.01)
*H03K 3/00* (2006.01)
(52) U.S. Cl.
USPC .......................................... 327/112; 327/108
(58) Field of Classification Search
USPC .................. 327/108–112, 538–543
See application file for complete search history.

(56) References Cited

U.S. PATENT DOCUMENTS

| | | | | |
|---|---|---|---|---|
| 5,796,278 A | * | 8/1998 | Osborn et al. | 327/108 |
| 5,929,664 A | * | 7/1999 | Alleven | 327/108 |
| 6,330,173 B1 | * | 12/2001 | Yamasaki et al. | 363/60 |
| 6,496,049 B2 | * | 12/2002 | Tsukagoshi et al. | 327/322 |
| 6,831,502 B1 | * | 12/2004 | Ooishi | 327/541 |
| 7,049,881 B2 | * | 5/2006 | Moon et al. | 327/541 |

FOREIGN PATENT DOCUMENTS

JP 2006-033436 2/2006

* cited by examiner

*Primary Examiner* — Hai L Nguyen
(74) *Attorney, Agent, or Firm* — Rader, Fishman & Grauer PLLC

(57) ABSTRACT

An output circuit for a bus whose output node is connected to a bus, including a first current source connected to a first reference potential, a first semiconductor switching element connected between the first current source and the output node, a current control circuit for controlling the first semiconductor switching element such that the first current source and the output node are connected when a voltage of the output node is lower than a reference voltage, and the first current source and the output node are disconnected when a voltage of the output node is higher than the reference voltage, and a voltage generating circuit which is connected between the output node and a second reference potential, and includes a second semiconductor switching element turned on/off based on an output control signal.

8 Claims, 10 Drawing Sheets

OUTPUT CIRCUIT FOR A BUS

BACKGROUND OF THE INVENTION

1. Field of the Invention

The present invention relates to an output circuit for a bus. More particularly, the present invention relates to an output circuit for a bus intended for consumer electronics control (CEC), which connects the control system of the entire system in a high definition multimedia interface (HDMI) used in, for example, digital input/output of a digital television.

2. Description of Related Art

The HDMI is used for digital input and output of a digital television. The HDMI connects a DVD player, a high-vision tuner, an AV amplifier and the like to a digital television. A single HDMI cable enables transmission of images, sounds and control signals (for example, refer to Japanese Patent Application Publication No. 2006-33436).

A control system for equipment connected by the HDMI is connected through a CEC bus. The CEC bus is a bi-directional bus.

FIG. 10 is a diagram showing an example of the configuration of an output circuit for a bi-directional bus for a CEC bus. The output circuit for a CEC bus 7A of related art has a resistor 1C, a Schottky diode 2A, an npn transistor 41, a resistor 42, and an output control circuit 5. An output node 6 is connected to the CEC bus 7A.

The Schottky diode 2A is provided for preventing a current from flowing back from the CEC bus 7A to a power source when power is off, and connected in series to the resistor 1C. One end of this series circuit is connected to a power supply potential Vcc and the other end is connected to the output node 6. In the specification of the CEC bus 7A, the current allowed to flow while power is off is defined as $1.8\,\mu A$, and the internal pull-up resistance is defined as $27K\Omega\pm5\%$. The resistor 1C and the Schottky diode 2A are required to satisfy this specification.

Between the output node 6 and a grounding potential Gnd, the npn transistor 41 and the resistor 42 are connected in series, and an output control signal is inputted to the base of the npn transistor 41. When the output control signal outputted from the output control circuit 5 becomes a high level, the electrical continuity between the emitter and the collector of the npn transistor 41 is completed, and a low level is outputted from the output node 6 to the CEC bus 7A. When the output control signal becomes low level, the npn transistor 41 is turned off, and a high level is outputted from the output node 6.

The Schottky diode 2A operates to prevent interference of the CEC functions of other equipment connected to the output node 6 while power is off.

SUMMARY OF THE INVENTION

In the abovementioned output circuit for a CEC bus, the Schottky diode prevents that the current from flowing back from the CEC bus and flowing into the power source while power is off. When the abovementioned output circuit for a CEC bus is formed as an integrated circuit, a special process is required to manufacture the Schottky diode. It is therefore difficult to form an integrated circuit by integrating a controller and the output circuit for a CEC bus. This raises the manufacturing costs.

Not limited to the above bus, but also for other buses, it is desirable to prevent the current from flowing back to the power source while power is off.

Thus, there is a demand for an output circuit for a bus which can be manufactured integrally with a controller by a general process not employing Schottky diode.

According to an embodiment of the present invention, there is provided an output circuit for a bus whose output node is connected to a bus. The output circuit for a bus includes a first current source connected to a first reference potential, a first semiconductor switching element connected between the first current source and the output node, a current control circuit for controlling the first semiconductor switching element such that the first current source is connected to the output node when a voltage of the output node is lower than the reference voltage, and the first current source and the output node is disconnected when a voltage of the output node is higher than the reference voltage. The voltage generating circuit further includes a second semiconductor switching element which is connected between the output node and a second reference potential, and turns on/off in response to an output control signal. For example, the first semiconductor switching element and the current control circuit have a function equivalent to that of a Schottky diode.

Preferably, the first current source includes a current mirror circuit composed of a pair of transistors. There is further provided a reference voltage generating circuit including a transistor having the same characteristic as the transistors included in the current mirror circuit. The reference voltage generating circuit generates the reference voltage based on a potential of a terminal of the transistor having the same characteristic.

Preferably, the first current source in the output circuit for a bus according to the present embodiment includes a current mirror circuit where a first resistor and a first transistor of a first conductivity type are connected in series, a second resistor and a second transistor of a first conductivity type are connected in series, a control terminal of the first transistor of the first conductivity type is connected to a control terminal of the second transistor of the first conductivity type, the control terminal and an output terminal of the first transistor of the first conductivity type are connected, and one end of the first resistor and one end of the second resistor are connected to the first reference potential. The first current source also includes a first internal current source where a first transistor of a second conductivity type and a third resistor are connected in series, a certain amount of voltage is supplied to a control terminal of the first transistor of the second conductivity type, and one end of the third resistor is connected to the second reference potential. An output of the first transistor of the first conductivity type included in the current mirror circuit is connected to an input of the first transistor of the second conductivity type included in the first internal current source. The reference voltage generating circuit includes a series circuit where a fourth resistor and a third transistor of a first conductivity type are connected in series, a control terminal and an output terminal of the third transistor of the first conductivity type are connected, and one end of the fourth resistor is connected to the first reference potential, and a second internal current source where a second transistor of a second conductivity type and a fifth resistor are connected in series, a certain amount of voltage is supplied to a control terminal of the second transistor of the second conductivity type, and one end of the fifth resistor is connected to the second reference potential. An output of the third transistor of the first conductivity type included in a series circuit is connected to an input of the transistor of the second conductivity type included in the second internal current source. The second transistor of the first conductivity type has the same characteristic with that of the third transistor of the first conductivity type, and the reference voltage generated in response to a potential of an input terminal and a potential of the control terminal of the third transistor of the first conductivity type.

According to other embodiment of the invention, there is provided an output circuit for a bus whose output node is connected to a bus. The output circuit for a bus includes a current mirror circuit connected to a first reference potential, a first current source where a first output of the current mirror circuit is connected to the output node, a second current source connected to a second reference potential, a first semiconductor switching element connected between a second output of the current mirror circuit and the second current source, a current control circuit for controlling the first semiconductor switching element such that the second output of the current mirror circuit is connected to the second current source when a voltage of the output node is lower than a reference voltage, and the second output of the current mirror circuit and the second current source are disconnected when a voltage of the output node is higher than the reference voltage. The output circuit for a bus further includes a voltage generating circuit being connected between the output node and the second reference potential, and including a second semiconductor switching element to be turned on/off in response to an output control signal.

Preferably, in the output circuit for a bus according to the present embodiment, the voltage generating circuit includes a resistor connected between the second semiconductor switching element and the second reference potential.

Preferably, the second semiconductor switching element in the output circuit for a bus is a field effect transistor where the output control signal is inputted to a gate, a source is connected to the second reference potential, and a drain is connected to the output node.

Preferably, the bus in the output circuit for a bus conforms to the CEC contained in the HDMI specification.

DETAILED DESCRIPTION OF THE EMBODIMENT

Figure 1:
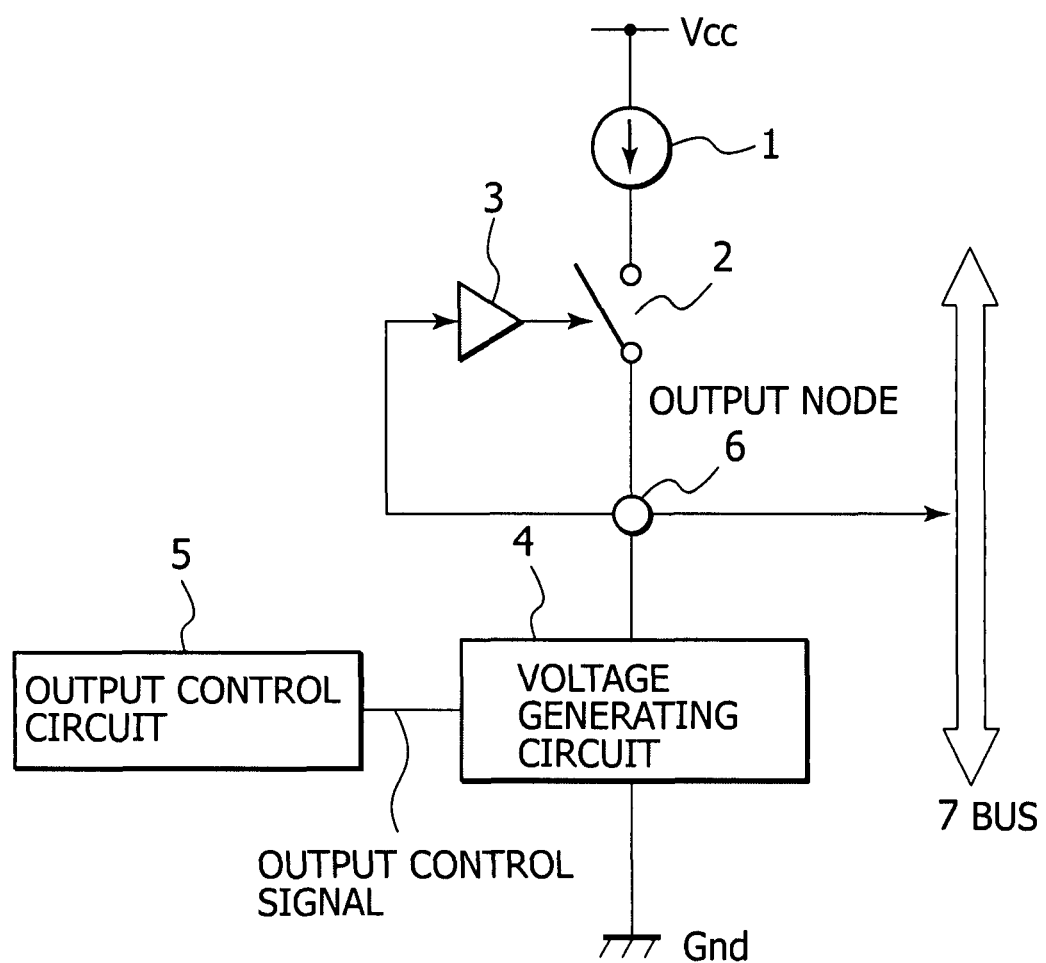
FIG. 1 is a block diagram showing an example of the configuration of an output circuit for a bus according to a first preferred embodiment of the present invention.

FIG. 1 is a block diagram showing an example of the configuration of an output circuit for a bus according to a first embodiment of the present invention. The output circuit for a bus shown in FIG. 1 includes a current source 1, a semiconductor switching element 2, a current control circuit 3, a voltage generating circuit 4, and an output control circuit 5. An output node 6 is connected to a bus 7.

The current source 1 is connected to a power supply potential Vcc, and outputs a certain amount of current. If the bus 7 is a CEC bus, the specification of the CEC bus is satisfied. Therefore, the current source 1 has a function equivalent to that of a resistor of 27 KΩ.

The current control circuit 3 compares a reference voltage with the voltage of the output node 6, and controls the semiconductor switching element 2. The element 2 connects the current source 1 to the output node 6 when the voltage of the output node 6 is lower than the reference voltage, and disconnects the current source 1 and the output node 6 when the voltage of the output node 6 is higher than the reference voltage.

The semiconductor switching element 2 and the current control circuit 3 have a function equivalent to that of a Schottky diode. If the bus 7 is a CEC bus, the specification of the CEC bus is satisfied. Hence, the semiconductor switching element 2 sets the current flow while power is off, to 1.8 μA and below.

The CEC bus is connected to a plurality of AV household appliances, such as digital televisions, DVC players, high-vision tuners and AV amplifications. When the power supply potentials Vcc of their equipment are lowered due to power off or the like, the reference voltage is lowered. At this time, if other equipment is connected to the CEC bus output high level, the voltage of the output node remains high. In the present embodiment, when the reference voltage becomes lower than the voltage of the output node 6, as described above, the current control circuit 3 controls the semiconductor switching element 2 such that the current source 1 and the output node 6 are disconnected. This prevents the current flowing back from the bus 7 to the current source 1.

One end of the voltage generating circuit 4 is connected to a grounding potential Gnd. When an output control signal is inputted from the output control circuit 5 while the semiconductor switching element 2 connects the current source 1 to the output node 6, the voltage generating circuit 4 generates an output voltage and outputs it to the output node 6.

The power supply potential Vcc in an embodiment is an example of a first reference potential, and the grounding potential Gnd is an example of the second reference potential in an embodiment. Further, the current source 1 is an example of the first current source, the semiconductor switching element 2 is an example of the first switching element in an embodiment, the current control circuit 3 is an example of the current control circuit in an embodiment, the voltage generating circuit 4 is an example of the voltage generating circuit in an embodiment, and the bus 7 is an example of the bus in an embodiment.

Figure 2:
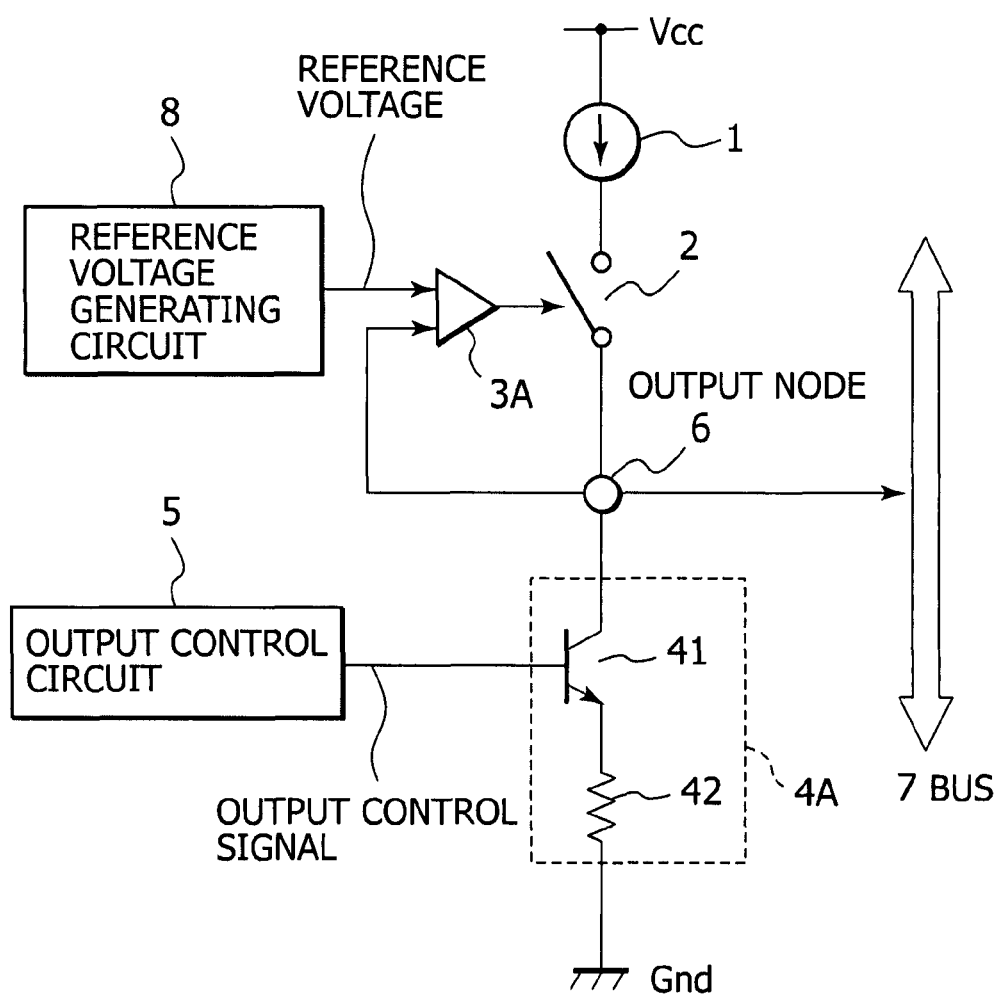
FIG. 2 is a block diagram showing an example of the configuration of an output circuit for a bus according to a second preferred embodiment of the present invention.

FIG. 2 is a block diagram showing an example of the configuration of an output circuit for a bus according to a second embodiment of the present invention. The output circuit for a bus shown in FIG. 2 has a current source 1, a semiconductor switching element 2, a current control circuit 3A, a voltage generating circuit 4A, an output control circuit 5, and a reference voltage generating circuit 8. Same reference numbers in FIG. 1 and FIG. 2 indicate same components. That is, the present embodiment is different from the first embodiment in that the current control circuit 3 and the voltage generating circuit 4 in the first embodiment are replaced by the current control circuit 3A and the voltage generating circuit 4A, respectively, and the reference voltage generating circuit 8 is added in the present embodiment. The configurations of the current source 1, the semiconductor switching element 2 and the output control circuit 5 are common to those in the first embodiment.

Figure 3:
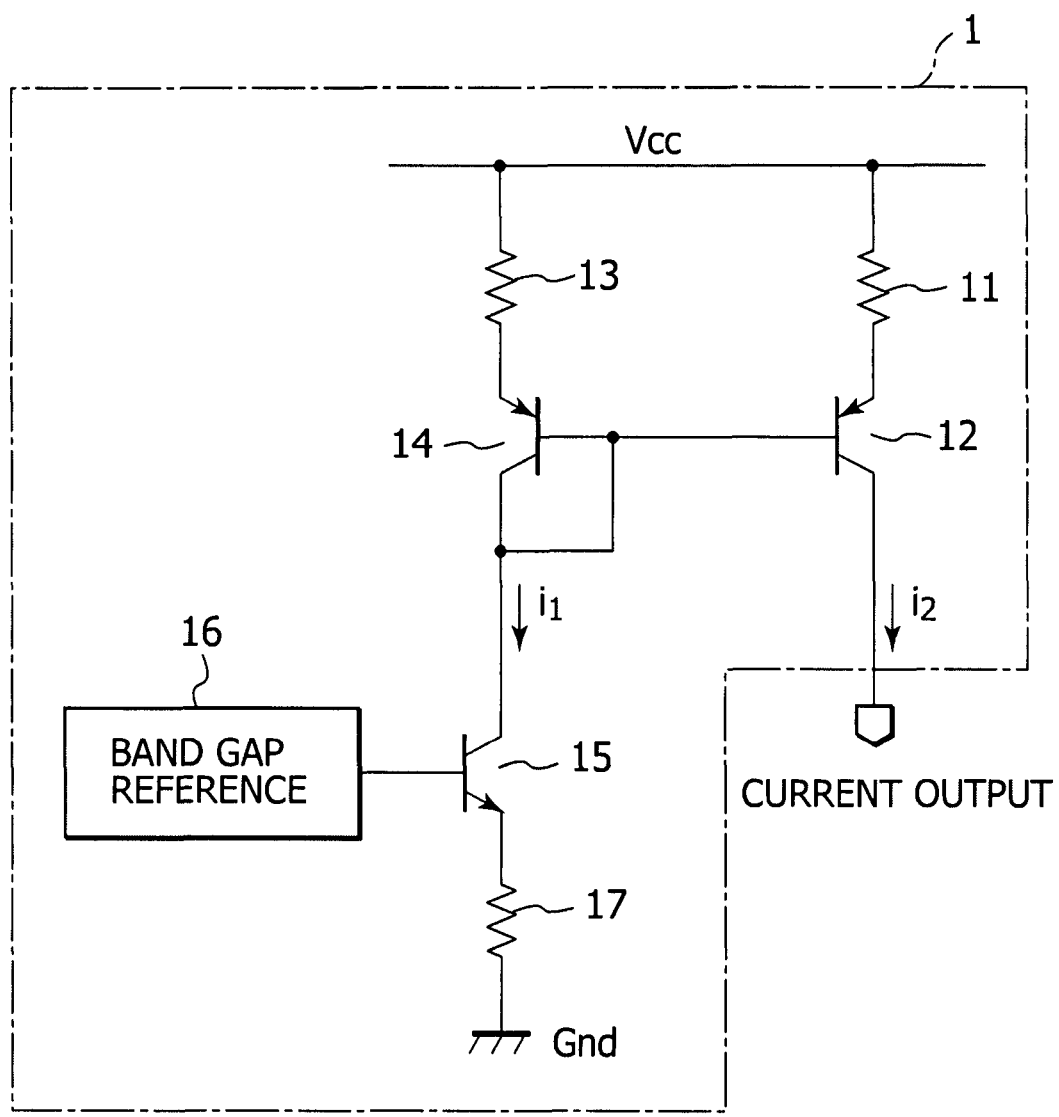
FIG. 3 is a diagram showing an example of the detailed configuration of a current source.

FIG. 3 is a diagram showing an example of the detailed configuration of a current source. The current source 1 has a resistor 11, a pnp transistor 12, a resistor 13, a pnp transistor 14, an npn transistor 15, a band gap reference 16, and a resistor 17. The resistor 11, the pnp transistor 12, the resistor 13 and the pnp transistor 14 form a current mirror circuit with a power supply potential Vcc as a reference. In the current mirror circuit, the resistor 13 and the pnp transistor 14 are connected in series, and the resistor 11 and the pnp transistor 12 are connected in series. Further, the base of the pnp transistor 14 and the base of the pnp transistor 12 are connected, and the base and the collector of the pnp transistor 14 are connected. In addition, one end of the resistor 13 and one end of the resistor 11 are connected to the power supply potential Vcc.

The npn transistor 15, the band gap reference 16 and the resistor 17 form a current source with the grounding potential Gnd as a reference, and output a certain amount of current i1. In this current source, the npn transistor 15 and the resistor 17 are connected in series, and a certain amount of voltage is supplied from the band gap reference 16 to the base of the npn transistor 15. One end of the resistor 17 is connected to the grounding potential Gnd.

The collector of the pnp transistor 14 as one output of the current mirror circuit is connected to the collector of the npn transistor 15 included in the current source with the grounding potential Gnd as a reference. Thus, the certain amount of current i1 flows to the pnp transistor 14 included in the current mirror circuit. Since the pnp transistor 14 and the pnp transistor 12 have same characteristics, a current i2 having the same magnitude as that of the current i1 flows to the pnp transistor 12. Accordingly, the certain amount of current i2 is outputted from a current output terminal as the other output of the current mirror circuit.

In the present embodiment, the resistor 13 is an example of the first resistor, the pnp transistor 14 is an example of the first transistor of the first conductivity type, the resistor 11 is an example of the second resistor, the pnp transistor 12 is an example of the second transistor of the first conductivity, the npn transistor 15 is an example of the first transistor of the second conductivity type, the resistor 17 is an example of the third resistor, and the current source formed of the npn transistor 15, the band gap reference 16 and the resistor 17 with the grounding potential Gnd as a reference is an example of the first internal current source.

Figure 4:
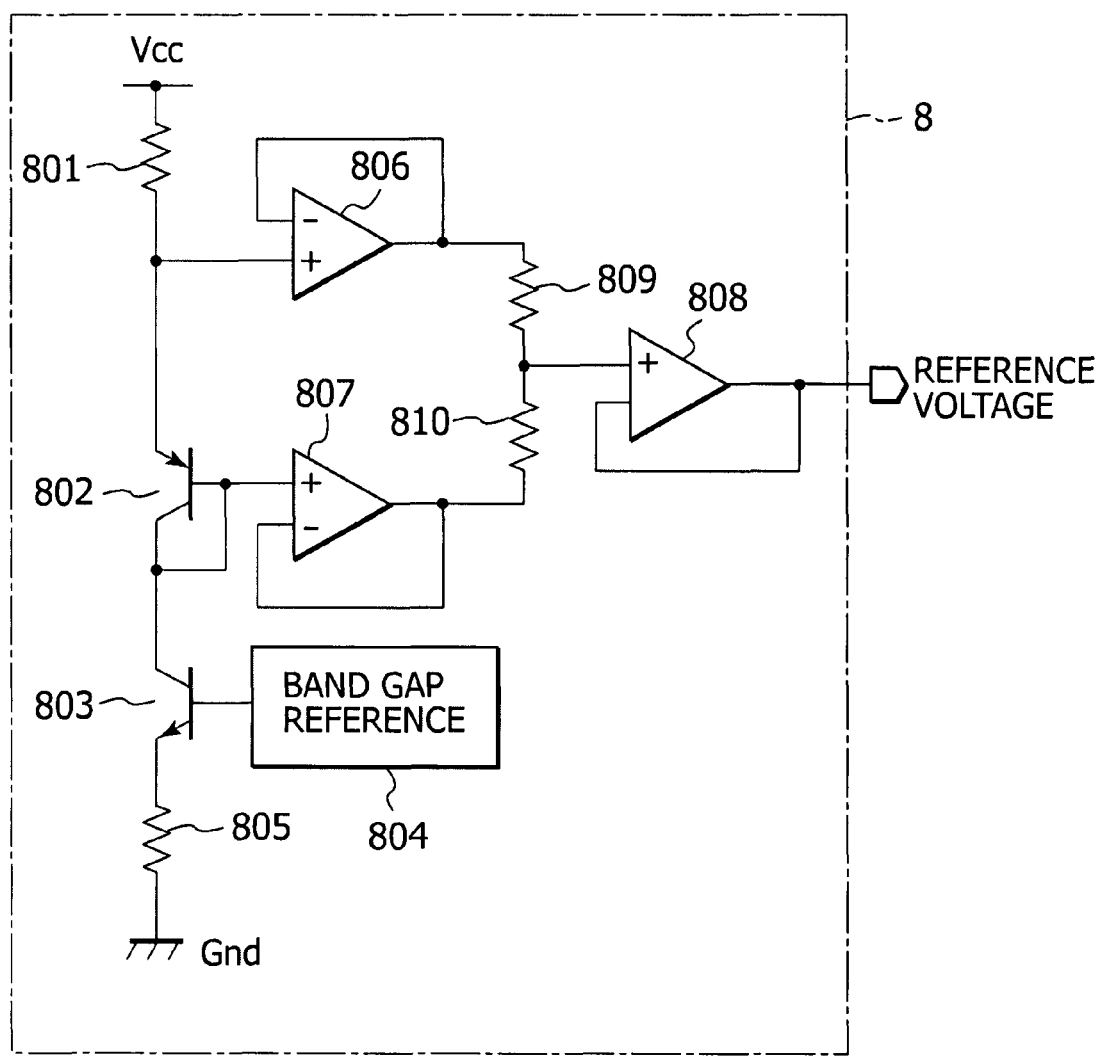
FIG. 4 is a diagram showing an example of the detailed configuration of a reference voltage generating circuit.

FIG. 4 is a diagram showing an example of the detailed configuration of a reference voltage generating circuit. The reference voltage generating circuit 8 has a resistor 801, a pnp transistor 802, an npn transistor 803, a band gap reference 804, a resistor 805, a voltage follower 806, a voltage follower 807, a voltage follower 808, a resistor 809, and a resistor 810.

The pnp transistor 802 of FIG. 4 imitates the pnp transistor 12 of FIG. 3 and is provided to monitor the emitter potential and the base potential of the pnp transistor 12. Based on the monitored potentials, a reference voltage is generated. In order that the pnp transistor 802 and the pnp transistor 12 have the same characteristic, connections and dimensions of the elements in FIG. 3 and corresponding elements in FIG. 4 should be same, for example.

Specifically, the resistor 801 and the pnp transistor 802 are connected in series. The base and the collector of the pnp transistor 802 are connected, and one end of the resistor 801 is connected to the power supply potential Vcc.

The npn transistor 803, the band gap reference 804 and the resistor 805 form a current source with the grounding potential Gnd as a reference. The npn transistor 803 and the resistor 805 are connected in series, and a certain amount of voltage is supplied to the base of the npn transistor 803. One end of the resistor 805 is connected to the grounding potential Gnd.

The collector of the pnp transistor 802 and the collector of the npn transistor 803 are connected.

The following pairs are corresponding elements to each other in different figures having same magnitudes; resistor 801 and the resistor 13, the pnp transistor 802 and the pnp transistor 14, the npn transistor 803 and the npn transistor 15, the band gap reference 804 and the band gap reference 16, and the resistor 805 and the resistor 17. However, as long as the pnp transistor 802 and the pnp transistor 12 have the same characteristic, the corresponding elements in FIG. 4 and FIG. 3 may have different dimensions relative to each other. To increase the output current by n times, the size of the pnp transistor may be increased by n times, and the resistor may be reduced to 1/n.

The voltage follower 806 fetches an emitter potential of the pnp transistor 802, and the voltage follower 807 fetches a base potential of the pnp transistor 802. The base potential and the emitter potential of the pnp transistor 802 fetched by the voltage follower 806 and the voltage follower 807 are divided by the resistor 809 and the resistance 810, respectively, and outputted as a reference voltage through the voltage follower 808. The pnp transistor 802 of FIG. 4 has the same characteristic as that of the pnp transistor 12 of FIG. 3, which means the base potential and the emitter potential inside the pnp transistor 12 of the current source 1 are divided to generate a reference voltage.

In the present embodiment, the resistor 801 is an example of the fourth resistor, the pnp transistor 802 is an example of the third transistor of the first conductivity type, the npn transistor 803 is an example of the second transistor of the second conductivity type, and the resistor 805 is an example of the fifth resistor.

The current control circuit 3A of FIG. 2 is different from the current control circuit 3 of FIG. 1 in that the reference voltage generating circuit 8 is provided in FIG. 2, and a reference voltage outputted from the reference voltage generating circuit 8 is inputted to the current control circuit 3A. The current control circuit 3A compares the reference voltage outputted from the reference voltage generating circuit 8 and the voltage of the output node 6, and then outputs a comparison result. Based on the comparison result obtained by the current control circuit 3A, the semiconductor switching element 2 is controlled. Specifically, when the voltage of the output node 6 is lower than the reference voltage, the semiconductor switching element 2 provides a connection between the current source 1 and the output node 6, such that the current of the current source 1 is outputted to the output node 6. When the voltage of the output node 6 is higher than the reference voltage, the semiconductor switching element 2 disconnects the current source 1 and the output node 6, to stop the current outputted from the current source 1.

That is, the pn junction between the base and the collector is forward biased when the base potential of the pnp transistor 12 in the current source 1 is lowered below the voltage of the output node 6 due to a decrease in the power supply potential Vcc. This state is detected by comparing the reference voltage with the voltage of the output node 6. The semiconductor switching element 2 is turned off and the pnp transistor 12 is separated from the output node 6, to prevent the current flowing from the bus 7.

The semiconductor switching element 2 can be realized by an npn transistor, an NMOS transistor, and the like. When a low level is outputted from the current control circuit 3A, the semiconductor switching element 2 is turned off, and the current output from the current source 1 is stopped. When a high level is outputted from the current control circuit 3A, the semiconductor switching element 2 is turned on, and the current of the current source 1 is outputted to the output node 6.

The current control 3A is an example of the current control circuit, and the semiconductor switching element 2 is an example of the first semiconductor switching element, in the present embodiment.

The voltage generating circuit 4A of FIG. 2 defines the configuration of the voltage generating circuit 4 of FIG. 1. The voltage generating circuit 4A has a npn transistor 41 and a resistor 42. The npn transistor 41 and the resistor 42 are connected in series, and one end of this series circuit is connected to the output node 6 and the other end is connected to the grounding potential Gnd. An output control signal is inputted from the output control circuit 5 to the base of the npn transistor 41. When the output control signal becomes a high level, the npn transistor 41 is turned on, and the electrical continuity between the emitter and the collector is completed, and a low level is outputted from the output node 6.

In the present embodiment, the current control circuit 3A is an example of the current control circuit, the voltage generating circuit 4A is an example of the voltage generating circuit, the npn transistor 41 is an example of the second semiconductor switching element, and the resistor 42 is an example of the resistor.

Figure 5:
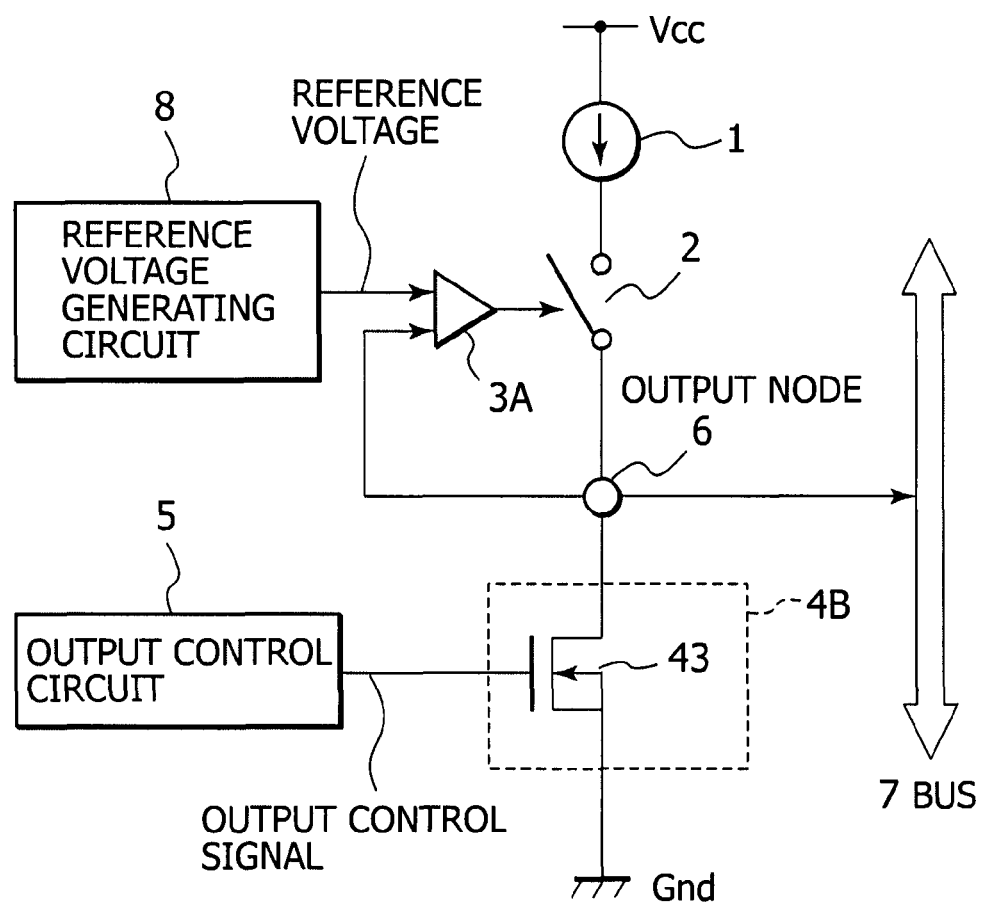
FIG. 5 is a block diagram showing an example of the configuration of an output circuit for a bus according to a third embodiment of the present invention.

FIG. 5 is a block diagram showing an example of the configuration of an output circuit for a bus according to a third embodiment of the present invention. The output circuit for a bus in FIG. 5 includes a current source 1, a semiconductor switching element 2, a current control circuit 3A, a voltage generating circuit 4B, an output control circuit 5, and a reference voltage generating circuit 8. In FIG. 5, the same reference numbers are used as those in FIG. 2 for same parts. That is, the third embodiment is different from the second embodiment in that the voltage generating circuit 4A in the second embodiment is replaced with the voltage generating circuit 4B. The configurations of the current source 1, the semiconductor switching element 2, the current control circuit 3A, the output control circuit 5, and the reference voltage generating circuit 8 are common to those in the second embodiment.

The voltage generating circuit 4B of the third embodiment has an NMOS transistor 43. In the NMOS transistor 43, an output control signal is inputted to the gate, and the source and the drain are connected to the grounding potential Gnd and the output node 6, respectively. When the output control signal outputted from the output control circuit 5 becomes a high level, the NMOS transistor 43 is turned on, and the electrical continuity between the source and the drain is completed, and a low level is outputted from the output node 6.

The NMOS transistor 43 is a kind of field effect transistor, and also an example of the field effect transistor in the embodiment.

Figure 6:
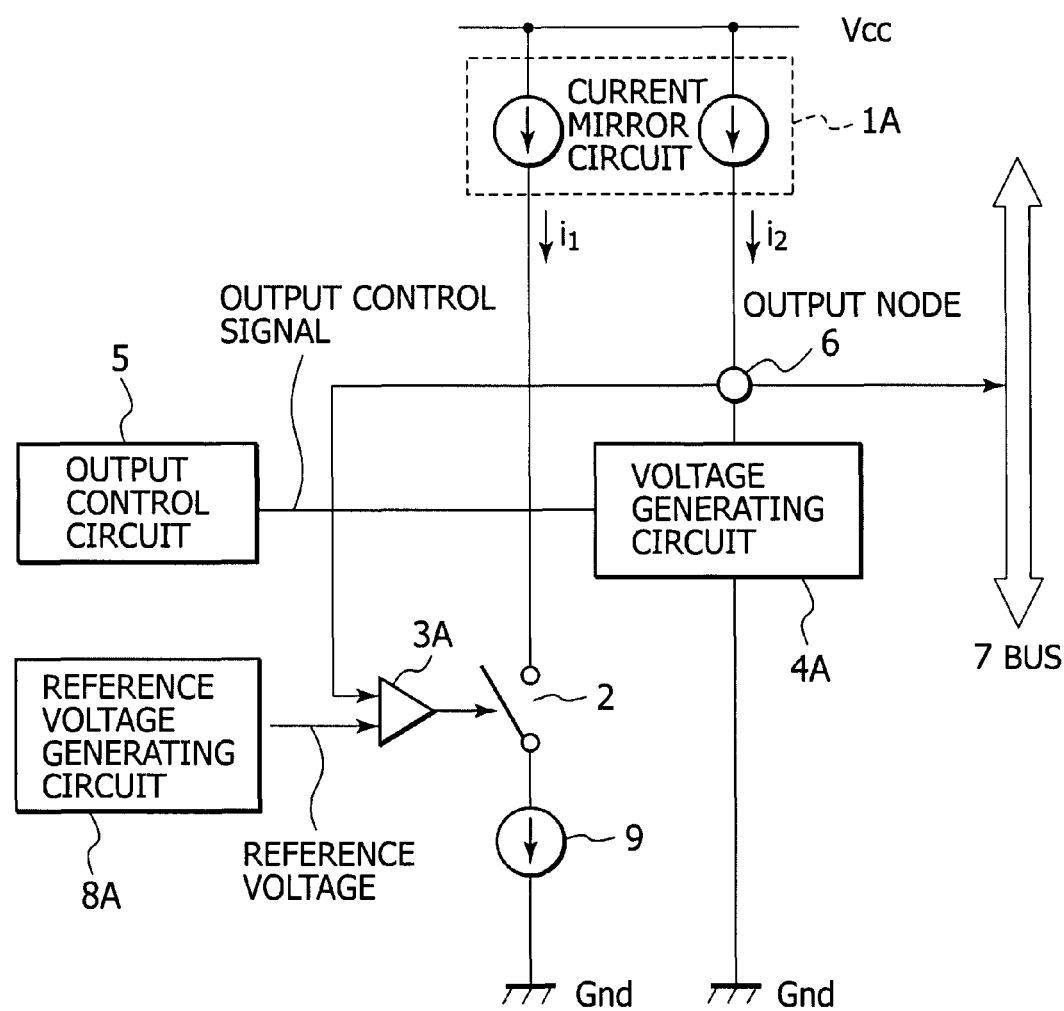
FIG. 6 is a block diagram showing an example of the configuration of an output circuit for a bus according to a fourth embodiment of the present invention.

FIG. 6 is a block diagram showing an example of the configuration of an output circuit for a bus according to a fourth embodiment of the present invention. The output circuit for a bus in FIG. 6 has a current source 1A, a semiconductor switching element 2, a current control circuit 3A, a voltage generating circuit 4A, an output control circuit 5, a reference voltage generating circuit 8A, and a current source 9. In FIG. 6, the same reference numbers are used as those in FIG. 2 for same parts. That is, the fourth embodiment is different from the second embodiment in that the current source 1 and the reference voltage generating circuit 8 are replaced with the current source 1A and the reference voltage generating circuit 8A, respectively, the arrangement of the semiconductor switching element 2 is changed, and the current source 9 is newly added. The configurations of the semiconductor switching element 2, the current control circuit 3A, the voltage generating circuit 4A and the output control circuit 5 are common to those in the second embodiment.

The current source 1A of the fourth embodiment is configured by a current mirror circuit, and its one output is connected to the semiconductor switching element 2 and the other output is connected to the output node 6. The current mirror circuit is formed by, for example, a pair of pnp transistors or a pair of PMOS transistors.

The functions of the semiconductor switching element 2 and the current control circuit 3A in the fourth embodiment are identical with those of the semiconductor switching element 2 and the current control circuit 3A in the second embodiment respectively, except that the semiconductor switching element 2 is disposed between the one output of the current mirror circuit included in the current source 1A and the current source 9. The semiconductor switching element 2 is configured by, for example, an npn transistor, an NMOS, and the like. The current source 9 is a current source setting a grounding potential Gnd as a reference. The current source 9 may be configured by, for example, a resistor. Alternatively, the current source 9 may be similar to the current source using the grounding potential Gnd as a reference, and being configured by the npn transistor 15, the band gap reference 16 and the resistor 17 included in the current source 1 of FIG. 3.

In the present embodiment, the current source 1A is an example of the first current source, and the current source 9 is an example of the second current source.

From the two outputs of the current mirror circuit of the current source 1A, a current i1 and a current i2 having the same magnitude are outputted. Therefore, when the semiconductor switching element 2 is turned off, and the output of the current i1 is stopped, the output of the current i2 is also stopped. When the semiconductor switching element 2 is turned on and the current i1 is outputted, the current i2 is also outputted. Thus a switch between the current source 1A and the voltage generating circuit 4 is not required.

In the second embodiment, the semiconductor switching element 2 is disposed between the current source 1 and the voltage generating circuit 4A. It is therefore required that the reference voltage generating circuit 8 of the second embodiment has to generate a reference voltage by estimating the amount of a voltage drop caused by the semiconductor switching element 2. On the other hand, in the reference voltage generating circuit 8A of the fourth embodiment, a voltage effect caused by the semiconductor switching element 2 need not be counted.

Figure 7:
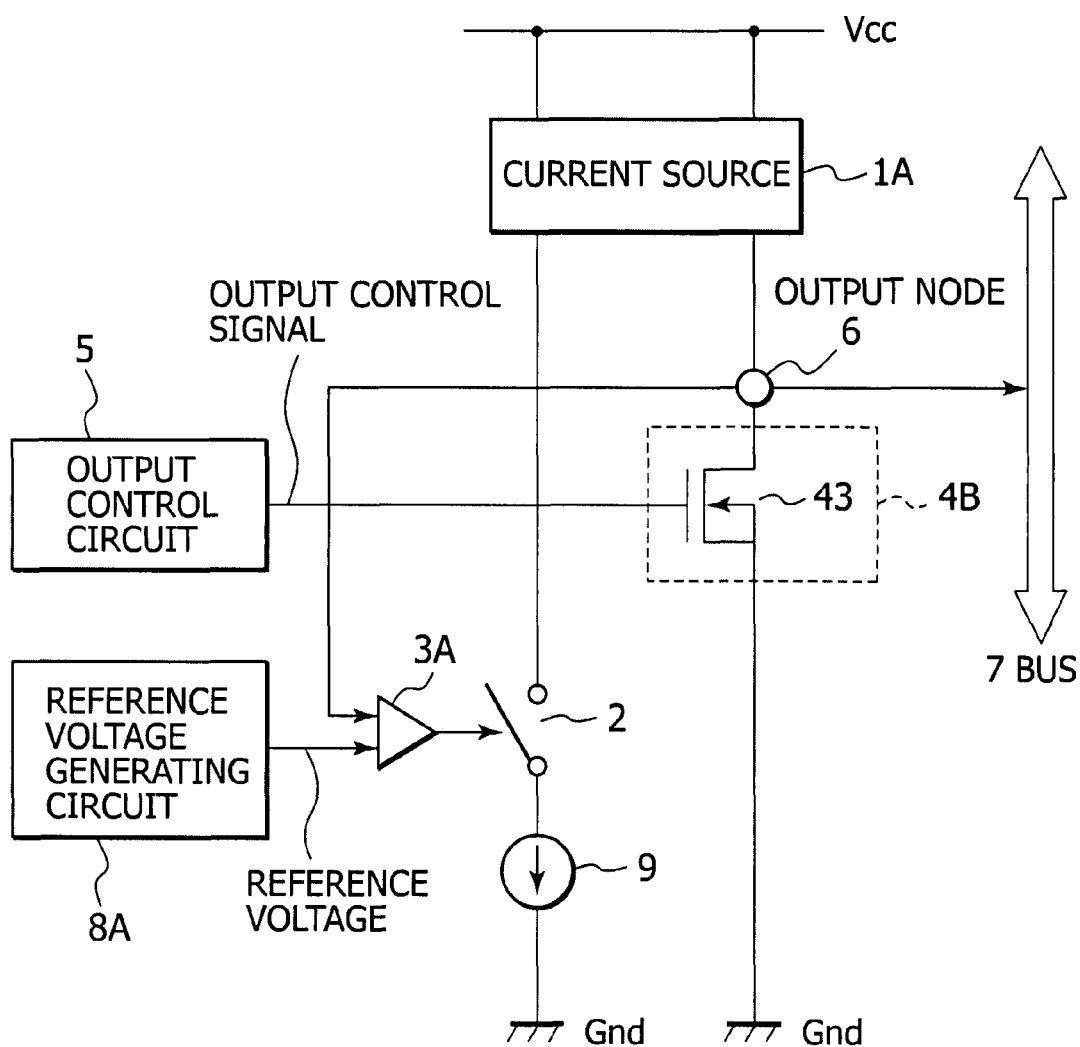
FIG. 7 is a block diagram showing an example of the configuration of an output circuit for a bus according to a fifth embodiment of the present invention.

FIG. 7 is a block diagram showing an example of the configuration of an output circuit for a bus according to a fifth embodiment of the present invention. The output circuit for a bus in FIG. 7 includes a current source 1A, a semiconductor switching element 2, a current control circuit 3A, a voltage generating circuit 4B, an output control circuit 5, a reference voltage generating circuit 8A, and a current source 9. In FIG. 7, the same reference numbers of those elements in FIG. 6 are used for same parts. That is, the fifth embodiment is different from the fourth embodiment in that the voltage generating circuit 4A of the fourth embodiment is replaced with the voltage generating circuit 4B of the third embodiment. The configurations of the current source 1A, the semiconductor switching element 2, the current control circuit 3A, the output control circuit 5, the reference voltage generating circuit 8A and the current source 9 are common to those in the fourth embodiment.

Figure 8:
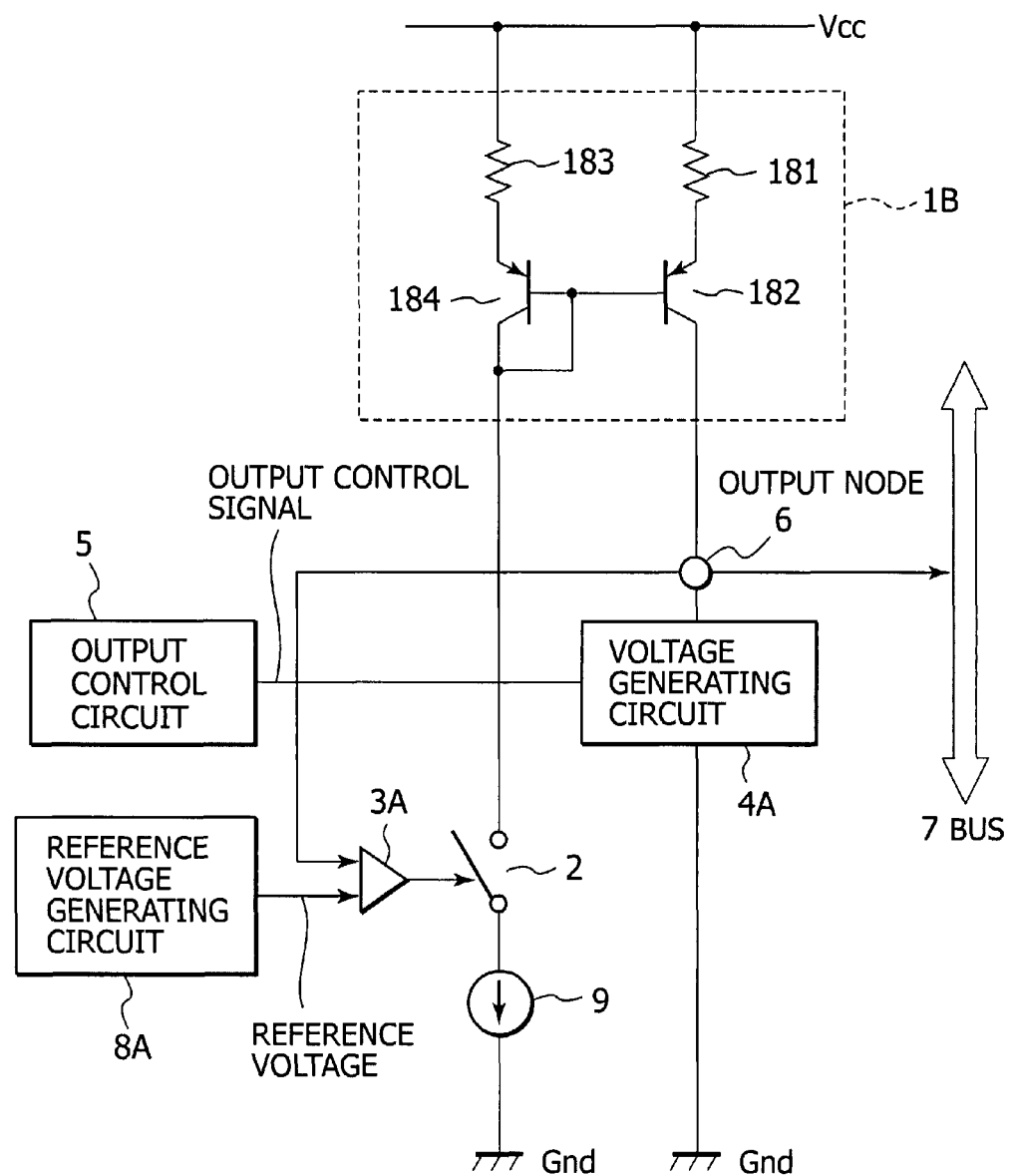
FIG. 8 is a block diagram showing an example of the configuration of an output circuit for a bus according to a sixth embodiment of the present invention.

FIG. 8 is a block diagram showing an example of the configuration of an output circuit for a bus according to a sixth embodiment of the present invention. The output circuit for a bus in FIG. 8 includes a current source 1B, a semiconductor switching element 2, a current control circuit 3A, a voltage generating circuit 4A, an output control circuit 5, a reference voltage generating circuit 8A, and a current source 9. The reference numbers in FIG. 8 that are the same as with those in FIG. 6 indicate same parts. That is, the sixth embodiment is different from the fourth embodiment in that the current source 1 of the fourth embodiment is replaced with the current source 1B. The configurations of the semiconductor switching element 2, the current control circuit 3A, the voltage generating circuit 4A, the output control circuit 5, the reference voltage generating circuit 8A and the current source 9 are common to those in the fourth embodiment.

The current source 1B includes a current mirror circuit formed by a resistor 181, a pnp transistor 182, a resistor 183, and a pnp transistor 184. The current source 1B is a specific example of the current source 1A using a current mirror circuit.

Figure 9:
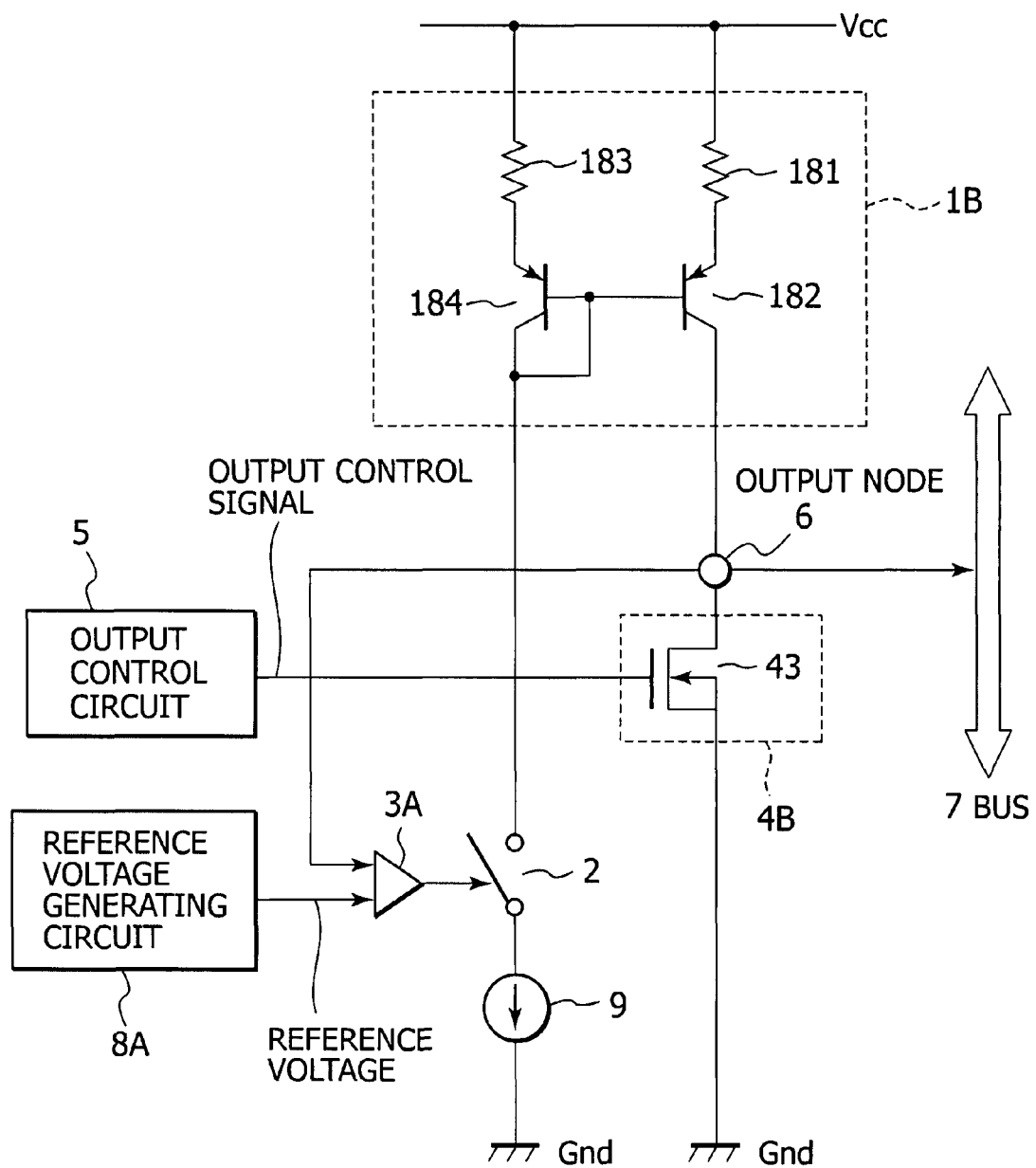
FIG. 9 is a block diagram showing an example of the configuration of an output circuit for a bus according to a seventh embodiment of the present invention.
Figure 10:
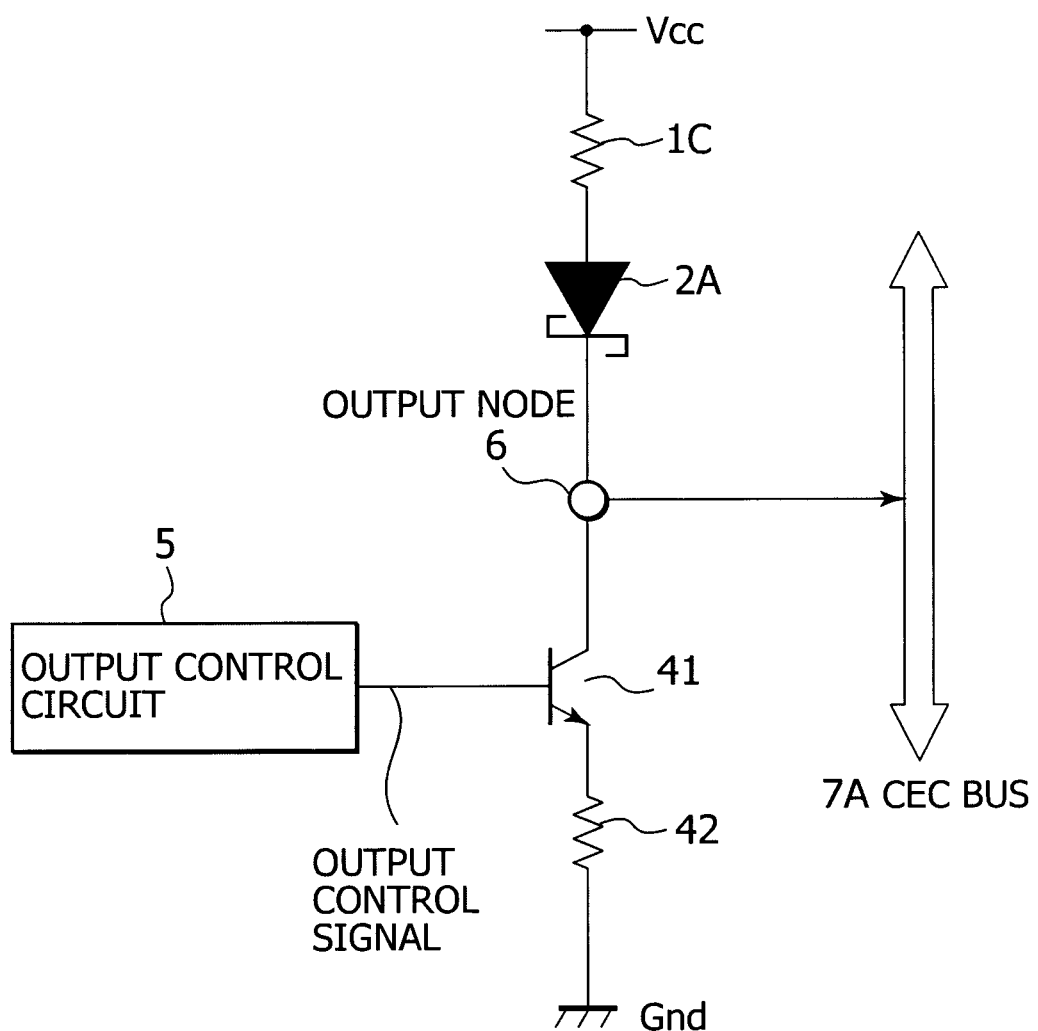
FIG. 10 is a diagram showing an example of the configuration of an output circuit for a bi-directional bus intended for a CEC bus in related art.

FIG. 9 is a block diagram showing an example of the configuration of an output circuit for a bus according to a seventh embodiment of the present invention. The output circuit for a bus in FIG. 9 includes a current source 1B, a semiconductor switching element 2, a current control circuit 3A, a voltage generating circuit 4B, an output control circuit 5, a reference voltage generating circuit 8A, and a current source 9. The reference numbers of FIG. 9 that are the same as those in FIG. 7 indicate the same parts. That is, the seventh embodiment is different from the fifth embodiment in that the current source 1A of the fifth embodiment is replaced with the current source 1B of the seventh embodiment. Configurations of the semiconductor switching element 2, the current control circuit 3A, the voltage generating circuit 4B, the output control circuit 5, the reference voltage generating circuit 8A and the current source 9 in the seventh embodiment are common to those in the sixth embodiment.

As described above, a combination of the semiconductor switching element 2 and the current control circuit 3, a combination of the semiconductor switching element 2, the current control circuit 3A and the reference voltage generating circuit 8, and a combination of the semiconductor switching element 2, the current control circuit 3A and the reference voltage generating circuit 8A have functions equivalent to those of the Schottky diode, and prevent the current from flowing back to the current source while power is off. Since the output circuits for a bus in the respective embodiments does not include a Schottky diode, the output circuits for a bus can be manufactured integrally with a controller by using the general process, and the manufacturing costs can be reduced when they are formed as integrated circuits.

Further, by the semiconductor switching element 2, the current flowing from the CEC bus 7 while power is off can be limited to 1.8 µA and below. Moreover, functions of the current source 1, the current source 1A, and the current source 1B can be set equivalent to the resistor of 27 KΩ. According to the foregoing respective embodiments, the output circuits for a CEC bus meeting the CEC specification can be formed, even though no Schottky diode is used. In addition to the bi-directional bus conforming to the HDMI-CEC specification, the respective embodiments may be applied to general buses. The present invention can be applicable to the general buses.

Thus, in accordance with embodiments of the present invention, since the output circuit for a bus does not include Schottky a diode, the output circuit for a bus which can be manufactured integrally with a controller by using a general process can be provided.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2006-334325 filed in the Japanese Patent Office on Dec. 12, 2006, the entire content of which being incorporated herein by reference.

What is claimed is:

1. An output circuit for a bus, whose output node is configured to be connected to the bus, comprising:
   a first current source connected to a first reference potential;
   a first semiconductor switching element connected between the first current source and the output node;
   a current control circuit for controlling the first semiconductor switching element such that the first current source and the output node are connected when a voltage of the output node is lower than a reference voltage, and the first current source and the output node are disconnected when the voltage of the output node is equal to or higher than the reference voltage; and
   a voltage generating circuit which is connected between the output node and a second reference potential, and includes a second semiconductor switching element turned on/off based on an output control signal.

2. The output circuit for a bus according to claim 1, comprising:
   the first current source including a current mirror circuit including a pair of transistors; and
   a reference voltage generating circuit which includes transistors having same characteristics as those of the transistors included in the current mirror circuit and generates the reference voltage based on a potential of a terminal of the transistors having the same characteristics.

3. The output circuit for a bus according to claim 2, wherein:
   the first current source includes the current mirror circuit in which a first resistor and a first transistor of a first conductivity type are connected in series, a second resistor and a second transistor of a first conductivity type are connected in series, a control terminal of the first transistor of the first conductivity type is connected to a control terminal of the second transistor of the first conductivity type, a control terminal and an output terminal of the first transistor of the first conductivity type are connected, and one end of the first resistor and one end of the second resistor are connected to a first reference potential, and also includes a first internal current source where a first transistor of a second conductivity type and a third resistor are connected in series, a certain voltage is supplied to a control terminal of the first transistor of the second conductivity type, and one end of the third resistor is connected to the second reference potential, and an output of the first transistor of the first conductivity type included in the current mirror circuit is connected to an input of the first transistor of the second conductivity type included in the first internal current source;

the reference voltage generating circuit includes a series circuit where a fourth resistor and a third transistor of a first conductivity type are connected in series, a control terminal and an output terminal of the third transistor of the first conductivity type are connected, and one end of the fourth resistor is connected to the first reference potential, and also includes a second internal current source where a second transistor of a second conductivity type and a fifth resistor are connected in series, a certain amount of voltage is supplied to a control terminal of the second transistor of the second conductivity type, and one end of the fifth resistor is connected to the second reference potential, and an output of the third transistor of the first conductivity type included in the series circuit is connected to an input of the second transistor of the second conductivity type included in the second internal current source; and the second transistor of the first conductivity type has same characteristics as those of the third transistor of the first conductivity type, and the reference voltage is generated based on a potential of an input terminal and a potential of the control terminal of the third transistor of the first conductivity type.

4. The output circuit according to claim 1, wherein:
the voltage generating circuit includes a resistor connected between the second semiconductor switching element and the second reference potential.

5. The output circuit according to claim 4, wherein the bus is a bus conforming to CEC contained in the HDMI specification.

6. The output circuit according to claim 1, wherein:
the second semiconductor switching element is a field effect transistor having a gate to which the output control signal is inputted, a source connected to the second reference potential, and a drain connected to the output node.

7. The output circuit according to claim 6, wherein the bus is a bus conforming to CEC contained in the HDMI specification.

8. The output circuit according to claim 1, wherein the bus is a bus conforming to CEC contained in the HDMI specification.

* * * * *